United States Patent [19]

Qureshi et al.

[11] Patent Number: 5,850,555
[45] Date of Patent: Dec. 15, 1998

[54] SYSTEM AND METHOD FOR VALIDATING INTERRUPTS BEFORE PRESENTATION TO A CPU

[75] Inventors: Qadeer A. Qureshi, Round Rock; Joseph A. Bailey; Dan S. Mudgett, both of Austin, all of Tex.

[73] Assignee: Advanced Micro Devices, Inc., Sunnyvale, Calif.

[21] Appl. No.: 575,683

[22] Filed: Dec. 19, 1995

[51] Int. Cl.$^6$ ............................. G06F 13/00; G06F 13/14
[52] U.S. Cl. ......................... 395/733; 395/734; 395/735; 395/736; 395/737; 395/738; 395/739; 395/740; 395/741; 395/742; 395/868; 395/869; 395/870; 395/871
[58] Field of Search ................................. 395/733, 734, 395/735, 736, 737, 738, 739, 740, 741, 742, 868, 869, 870, 871

[56] References Cited

U.S. PATENT DOCUMENTS

| | | | |
|---|---|---|---|
| 3,421,150 | 1/1969 | Quosig et al. | 340/172.5 |
| 3,665,415 | 5/1972 | Beard et al. | 340/172.5 |
| 4,271,468 | 6/1981 | Christensen et al. | 364/200 |
| 4,495,569 | 1/1985 | Kagawa | 364/200 |
| 4,644,465 | 2/1987 | Imamura | 364/200 |
| 4,985,831 | 1/1991 | Dulong et al. | 364/200 |
| 5,125,093 | 6/1992 | McFarland | 395/725 |
| 5,133,056 | 7/1992 | Miyamori | 395/275 |
| 5,274,785 | 12/1993 | Kuddes et al. | 395/325 |
| 5,283,904 | 2/1994 | Carson et al. | 395/325 |
| 5,317,747 | 5/1994 | Mochida et al. | 395/725 |
| 5,359,715 | 10/1994 | Heil et al. | 395/325 |
| 5,367,689 | 11/1994 | Mayer et al. | 395/725 |
| 5,381,541 | 1/1995 | Begun et al. | 395/500 |
| 5,410,710 | 4/1995 | Sarangdhar et al. | 395/725 |
| 5,428,794 | 6/1995 | Williams | 395/725 |
| 5,428,799 | 6/1995 | Woods et al. | 395/725 |
| 5,437,042 | 7/1995 | Culley et al. | 395/800 |
| 5,438,677 | 8/1995 | Adams et al. | 395/736 |
| 5,446,910 | 8/1995 | Kennedy et al. | 395/800 |
| 5,467,351 | 11/1995 | Baumert | 370/85.15 |
| 5,495,615 | 2/1996 | Nizar et al. | 395/733 |
| 5,530,891 | 6/1996 | Gephardt | 395/800 |
| 5,548,762 | 8/1996 | Creedon et al. | 395/733 |
| 5,555,413 | 9/1996 | Lohman et al. | 395/733 |
| 5,555,420 | 9/1996 | Sarangdhar et al. | 395/739 |
| 5,555,430 | 9/1996 | Gephardt et al. | 395/800 |
| 5,564,060 | 10/1996 | Mahalingaiah et al. | 395/871 |
| 5,568,649 | 10/1996 | MacDonald et al. | 395/868 |
| 5,613,126 | 3/1997 | Schmidt | 395/733 |
| 5,613,128 | 3/1997 | Nizar et al. | 395/739 |
| 5,640,571 | 6/1997 | Hedges et al. | 395/734 |
| 5,675,811 | 10/1997 | Broedner et al. | 395/750 |
| 5,696,976 | 12/1997 | Nizar et al. | 395/739 |

OTHER PUBLICATIONS

Intel MultiProcessor Specification Version 1.1, Apr. 1994, pp. 1–54.

Primary Examiner—Ayaz R. Sheikh
Assistant Examiner—Valerie Darbe
Attorney, Agent, or Firm—Conley, Rose & Tayon; B. Noel Kivlin

[57] ABSTRACT

A programmable interrupt controller for use in computer systems including one or more CPUs is provided. The programmable interrupt controller includes an interrupt request interface, a validity checker, and at least one processor interface. The validity checker monitors the state of each interrupt request as it is processed through the interrupt controller. The interrupt request is canceled if the interrupt request becomes invalid. Alternatively, the programmable interrupt controller issues a spurious interrupt vector if the interrupt request becomes invalid after a CPU has responded.

17 Claims, 5 Drawing Sheets

| Status | Vector | Priority | Destination | Mask | Affinity | Type | Enabled |

Exemplary Interrupt Field

FIG. 5

SYSTEM AND METHOD FOR VALIDATING INTERRUPTS BEFORE PRESENTATION TO A CPU

BACKGROUND OF THE INVENTION

1. Field of the Invention

The present invention relates to interrupts within a computer system, and more specifically to an interrupt controller for more efficient handling of interrupts in a computer system.

2. Description of the Related Art

A typical computer system contains at least one interrupt service provider, usually a central processing unit (CPU), and a number of input/output (I/O) devices peripheral to the CPU(s). These I/O devices commonly include hard disk drives, floppy disk drives, video adapters, parallel ports, serial ports, and other similar I/O type devices. An I/O device may need to alert the CPU(s) or request service when it completes a task or has a status change, such as finishing a data transfer, completing an operation, receiving data, or the occurrence of an error condition.

The typical mechanism for an I/O device to request service from the CPU(s) involves an interrupt request. An interrupt request is generally a hardware signal sent from the requesting device to a CPU notifying the CPU that the I/O device requires service. Other system devices such as timers, direct memory access (DMA) controllers, and other processors may generate interrupt request signals.

One advantage of using interrupts over other techniques, such as polling, is that the CPU is free to perform other operations between interrupts. When a CPU receives an interrupt request, it stops executing the current instruction routine, saves its state, and jumps to an interrupt service routine. The interrupt service routine includes instructions specific to the device requesting the interrupt so that the CPU can respond to the device condition or status change that instigated the interrupt request. When the interrupt service routine is completed, the CPU restores its state and returns to its location prior to the interrupt.

Referring to FIG. 1, a computer system 100 using interrupts is shown according to the prior art. The computer system 100 includes a CPU 110, and a main memory system 120 coupled to a host bus 180. The main memory system 120 typically includes a memory controller and system memory (not shown). A bus bridge 140 is coupled to the host bus 180 and an expansion bus 190 and typically includes a DMA controller (not shown). The expansion bus 190 typically conforms to a popular bus standard such as the Industry Standard Architecture (ISA), Extended Industry Standard Architecture (EISA), Microchannel Architecture (MCA), or Peripheral Component Interconnect (PCI). Alternatively, multiple expansion buses are included, such as a PCI bus further coupled to an ISA bus. Several I/O devices 150, 160, 170 are coupled to the expansion bus 190. The I/O devices 150, 160, 170 are typically devices such as a floppy disk drive, video adapter, parallel port, or other devices as are well known in the art.

The bus bridge 140 and the I/O devices 150, 160, 170 generate interrupt requests along interrupt request lines 142, 152, 162, 172, respectively, to notify the CPU 110 that service is needed. The interrupt, requests along lines 142, 152, 162, 172 are collected by a programmable interrupt controller (PIC) 130. Generally, when the programmable interrupt controller 130 receives one of the interrupt requests along lines 142, 152, 162, 172 it sends an interrupt signal on line 132 to the CPU 110. When the CPU 110 receives the interrupt signal on line 132, it finishes its current operation and sends an interrupt acknowledge along line 112 to the programmable interrupt controller 130. When the programmable interrupt controller 130 receives the interrupt acknowledge it sends an interrupt vector to the CPU 110 over the host bus 180. The interrupt vector indicates the location of the appropriate interrupt service routine to the CPU 110.

Generally speaking, in a typical system, a programmable interrupt controller receives the interrupt request signals from the various system devices and organizes the requests to be sent to the CPU(s). Normally, the programmable interrupt controller includes a mask register associated with each interrupt. The mask register is programmed to block a certain interrupt so that the CPU will not be interrupted by that particular interrupt. The programmable interrupt controller contains other registers associated with each interrupt for indicating information such as the interrupt status and interrupt vector for each interrupt.

The programmable interrupt controller also functions as an overall manager for interrupt requests. It receives the interrupt requests from each device, determines which requests are sent to the CPU(s) first, and handles new incoming interrupt requests. Some devices have more immediate need for service than other devices. Therefore, the programmable interrupt controller provides a priority system to be assigned to the interrupt requests. Generally, the programmable interrupt controller determines which one of the current interrupt requests has the highest priority and forwards that request to a CPU first. Occasionally, an interrupt request will be received by the programmable interrupt controller that has a higher priority than the interrupt request currently being serviced. One technique commonly employed to deal with this situation is interrupt nesting. In interrupt nesting, the programmable interrupt controller allows the incoming interrupt request to interrupt the servicing of an earlier interrupt request currently being serviced if the incoming interrupt request is of higher priority than the earlier interrupt request currently being serviced. If the incoming interrupt request is not of higher priority, it is put in order with other pending interrupt requests, usually according to the source of the interrupt. However, this requires that the queue in each nesting buffer be of sufficient size to accommodate all of the potential interrupt sources. Accordingly, there is a need for an interrupt controller that will optimize the storage of pending interrupts.

In addition to resolving priority among devices needing to be serviced, the controller will also need to resolve a task priority to determine to which CPU in a multiple CPU system the interrupt should be sent Typically, the CPU or device servicing an interrupt is assigned a task priority according to the level of importance of the task being performed. When a new task is to be performed, it is customary to search for a device that has the lowest task priority, and assign the new task to that device (for an interrupt that does not have a destination previously specified). However, if more than one device shares the same task priority, there is a chance that one device will always end up performing the new task, while other devices a the same task priority level may never be assigned the task. Therefore, it would be desirable to introduce a scheme to ensure that no such uneven distribution of system load occurs.

It can easily be understood that a relatively large amount of time may pass before an interrupt request is serviced, especially if the interrupt request has a low priority. The amount of time between the assertion of an interrupt request and the actual servicing of the interrupt request is called the interrupt latency. A problem associated with large interrupt latencies is that the status of the requesting device may change during the latency period so that servicing is no longer required. Thus the CPU will unnecessarily execute the interrupt service routine. This unnecessary execution of interrupt service routines results in extra overhead because the CPU spends time trying to service a condition which no longer exists, and thus overall system throughput is degraded. Therefore, a technique is desired for preventing invalid interrupt requests from being sent to the CPU.

A typical programmable interrupt controller implementation includes storage registers associated with each interrupt which store the current state of the interrupt, such as pending or in-service. Also, storage registers are required to store information for each interrupt request, such as the vector information and the priority level. Interrupt request receiving circuitry in the programmable interrupt controller coordinates the interrupt request state and other information with processor interface circuitry in the programmable interrupt controller. For systems with a large number of interrupt request sources, the amount of circuitry required to implement the above storage registers is very large. If the system supports multiple CPUs, then the above storage registers may need to be repeated in the programmable interrupt controller for each CPU, further increasing the size of the circuitry. Also, a large amount of circuitry is required to coordinate, manage, and access the storage registers. For an integrated programmable interrupt controller, a large portion of the chip area is require to implement the storage registers and associated circuitry. Therefore, it is desirable to have a more efficient way of referencing and implementing the required storage information for each interrupt.

Additionally, a typical programmable interrupt controller includes control circuitry associated with each interrupt request input to track the changes in the state of the interrupt request. This control circuitry includes some storage elements that are used to store the current state, and some combinatorial logic to determine the outputs and the next state based on the current state and other inputs. Similar control circuitry is required for each interrupt request input. If the number of interrupt request inputs is large, the amount of circuitry required to implement all the control circuitry can become prohibitively large. Therefore, a more efficient way of implementing the interrupt request control circuitry is desired.

SUMMARY OF THE INVENTION

The present invention provides an improved programmable interrupt controller for use in a computer system including one or more CPUs. In one embodiment, the programmable interrupt controller is coupled to a host bus and an expansion bus. At least one CPU and a main memory system are also coupled to the host bus. A bus bridge device couples the host bus to the expansion bus. At least one I/O device is coupled to the expansion bus and generates an interrupt request signal. The bus bridge and other bus devices may also generate interrupt request signals. The programmable interrupt controller receives the interrupt requests and provides processor interrupt signals to the one or more CPUs. The programmable interrupt controller also receives interrupt acknowledge signals from the one or more CPUs.

One embodiment of the programmable interrupt controller includes an interrupt request interface, a validity checker, and one or more processor interfaces. Interrupt requests are received by the interrupt request interface, processed, and sent to the appropriate processor interface. The validity checker monitors the state of the interrupt request signals to assure the interrupts remain valid throughout processing. Valid interrupt requests are issued to one of the one or more CPUs by the appropriate processor interface asserting a processor interrupt signal. The CPU responds to the processor interrupt with an interrupt acknowledge which is received by the appropriate processor interface on the corresponding interrupt acknowledge signal. However, if the validity checker determines the interrupt request becomes invalid before the CPU returns the interrupt acknowledge, the processor interrupt signal is unasserted to prevent the CPU from needlessly responding. If the interrupt request remains valid and the CPU responds, the processor interface sends an interrupt vector to the CPU. If the validity checker determines the interrupt request is still valid, a normal interrupt vector is returned. However, if the interrupt request has become invalid, a spurious interrupt vector is returned.

Broadly speaking, the present invention contemplates a computer system with an interrupt controller which includes interrupt request interface circuitry for receiving interrupt requests and handling the status and priority of the interrupt requests; processor interface circuitry coupled to the interrupt request interface circuitry, for generating processor interrupts and receiving processor interrupt acknowledge signals; and a interrupt request validity checker coupled to the interrupt request interface circuitry and to the processor interface circuitry, wherein the interrupt request validity checker determines when an interrupt request becomes invalid and cancels invalid interrupt requests. When the validity checker detects an invalid interrupt request, the processor interface circuitry does not generate a corresponding processor interrupt, removes the processor interrupt if it has already been generated, and returns a spurious interrupt vector if a corresponding processor interrupt acknowledge has already been received. Thus the CPU may be prevented from needlessly responding to an invalid interrupt request, or if the CPU has already responded, the CPU may quickly return from a short spurious interrupt routine instead of executing a full interrupt service routine. Overall system throughput may be increased by preventing a CPU from needlessly responding to an invalid interrupt request or executing a full interrupt service routine for an invalid interrupt request.

BRIEF DESCRIPTION OF THE DRAWINGS

A better understanding of the present invention can be obtained when the following detailed description of the preferred embodiment is considered in conjunction with the following drawings, in which:

FIG. 5 illustrates an exemplary information field according to one embodiment of the present invention.

Figure 1:
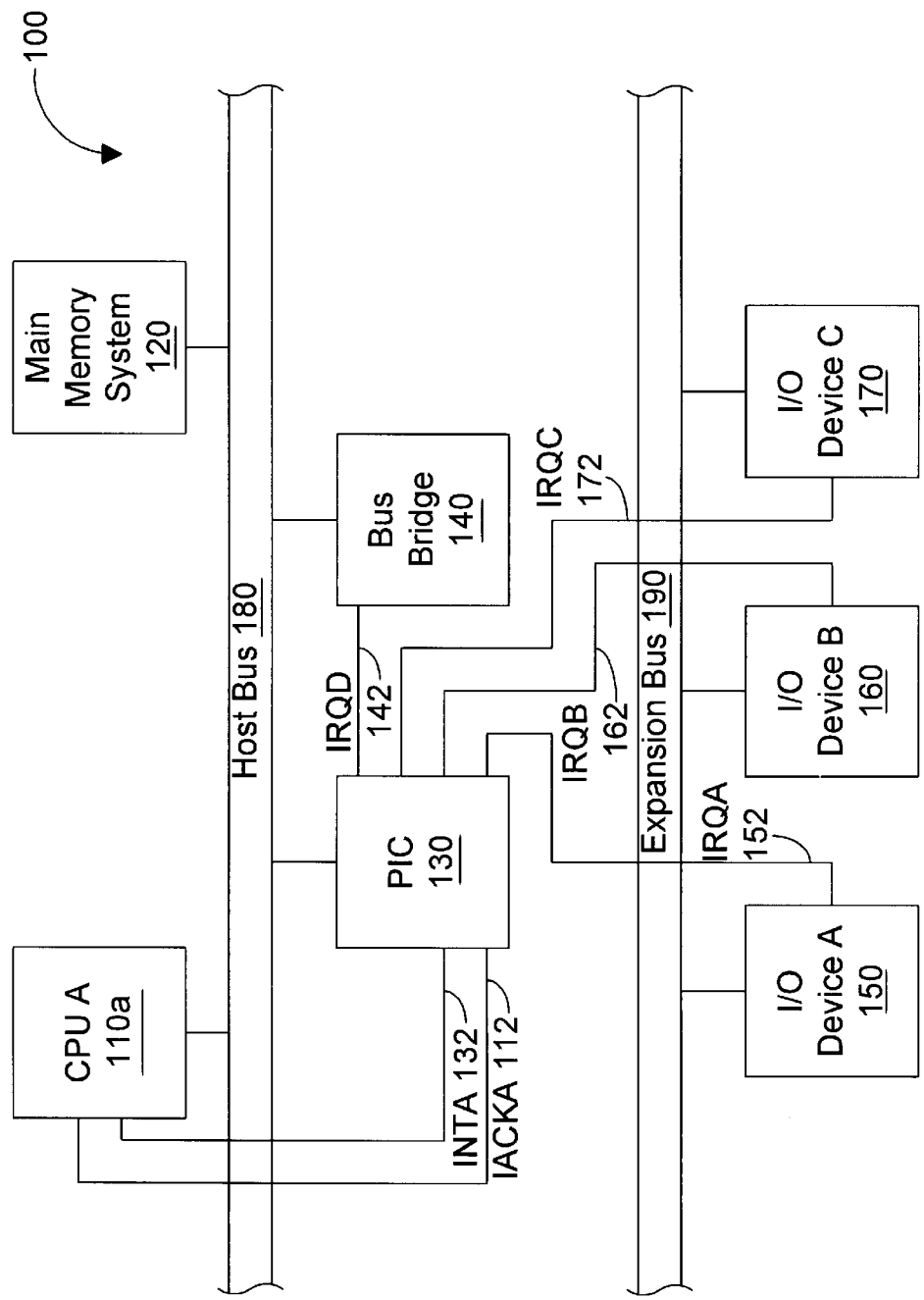
FIG. 1 is a block diagram illustrating a computer system with a programmable interrupt controller according to the prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
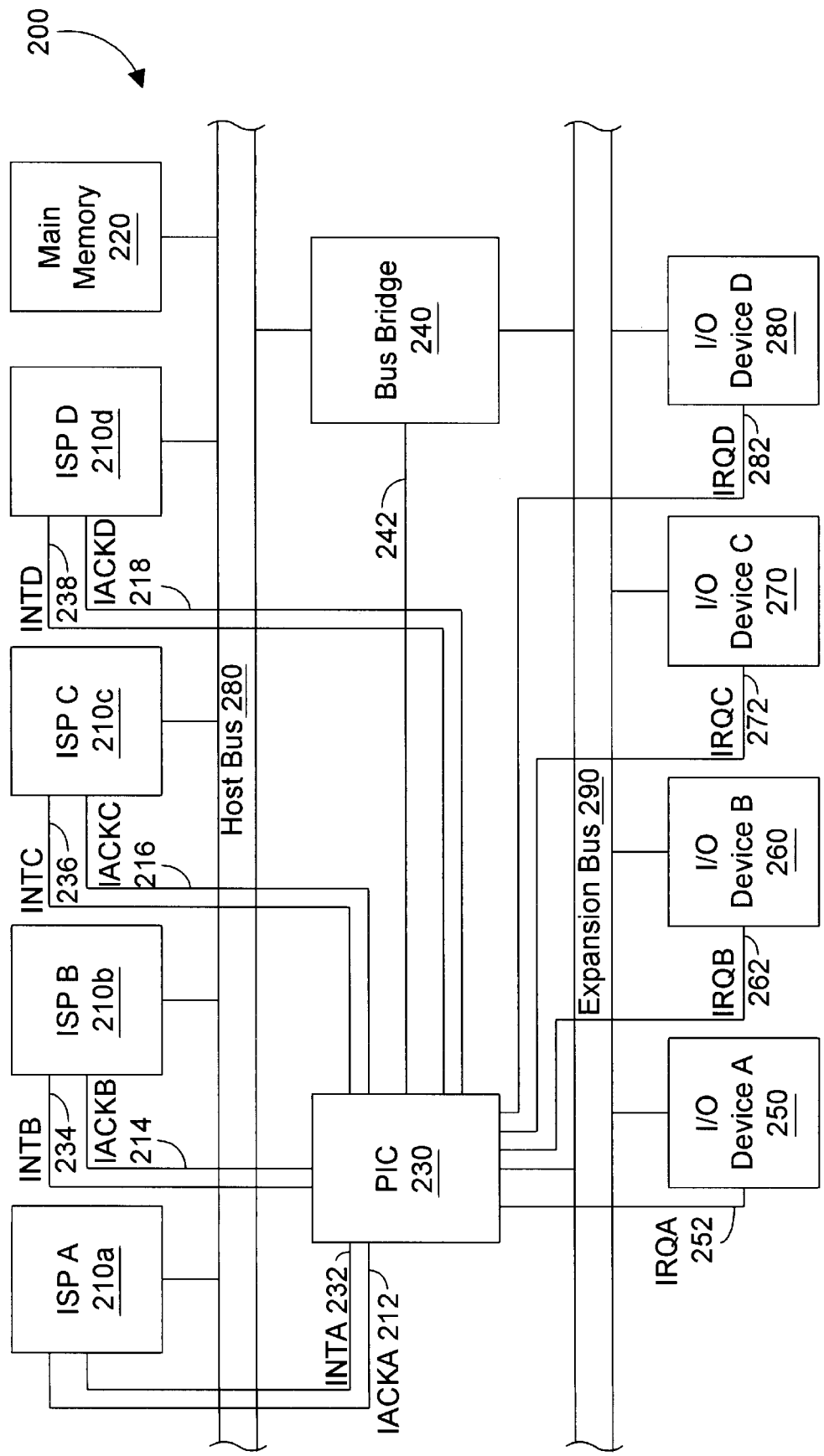
FIG. 2 is a block diagram illustrating a computer system with a programmable interrupt controller according to one embodiment of the present invention.

Referring now to the drawings, FIG. 2 is a block diagram of a computer system 200 including a programmable interrupt controller 230 according to one embodiment of the present invention. The computer system includes interrupt service providers (ISPs) 210a, 210b, 210c, and 210d, each coupled to a host bus 280, and a main memory system 220 coupled to the host bus 280. The ISPs may be central processing units (CPUs). The main memory system 220 includes a memory controller and system memory (not shown). A bus bridge 240 is coupled to the host bus 280 and an expansion bus 290. The expansion bus 290 conforms to a popular bus standard such as the Industry Standard Architecture (ISA), Extended Industry Standard Architecture (EISA), Microchannel Architecture (MCA), or Peripheral Component Interconnect (PCI). In other embodiments of the invention, multiple expansion buses are included, such as a PCI bus further coupled to an ISA bus. Several I/O devices 250, 260, 270, 280 are coupled to the expansion bus 290. The I/O devices 250, 260, 270, 280 are typically devices such as a floppy disk drive, video adapter, parallel port, or other devices as are well known in the art. It should be noted that in other embodiments, the number of processors and I/O devices are not necessarily equal. In other embodiments, different types and different numbers of I/O devices may be present.

The bus bridge 240 and the I/O devices 250, 260, 270 generate interrupt requests 242, 252, 262, 272, respectively, to notify one of the ISPs 210a, 210b, 210c, 210d that service is needed. The interrupt requests 242, 252, 262, 272 are collected by a programmable interrupt controller (PIC) 230. The programmable interrupt controller 230 is coupled to the expansion bus 290. It should be noted that programmable interrupt controller 230 may be coupled to host bus 280. When the programmable interrupt controller 230 receives one of the interrupt requests 242, 252, 262, 272 it determines whether or not to send an ISP interrupt signal 232, 234, 236, 238 to one of the ISPs 210a, 210b, 210c. Additionally, the programmable interrupt controller 230 receives interrupt acknowledge signals 212, 214, 216, 218 from the ISPs 210a, 210b, 210c, 210d, respectively. The programmable interrupt controller 230 may provide a interrupt vector to one of the ISPs 210a, 210b, 210c, 210d over the host bus 280. The interrupt vector indicates the location in memory of an interrupt service routine for handling the event that initiated the corresponding interrupt request. The programmable interrupt controller 230 is responsible for other interrupt management tasks as well. A more detailed description is given below for one embodiment of the programmable interrupt controller 230.

Figure 3:
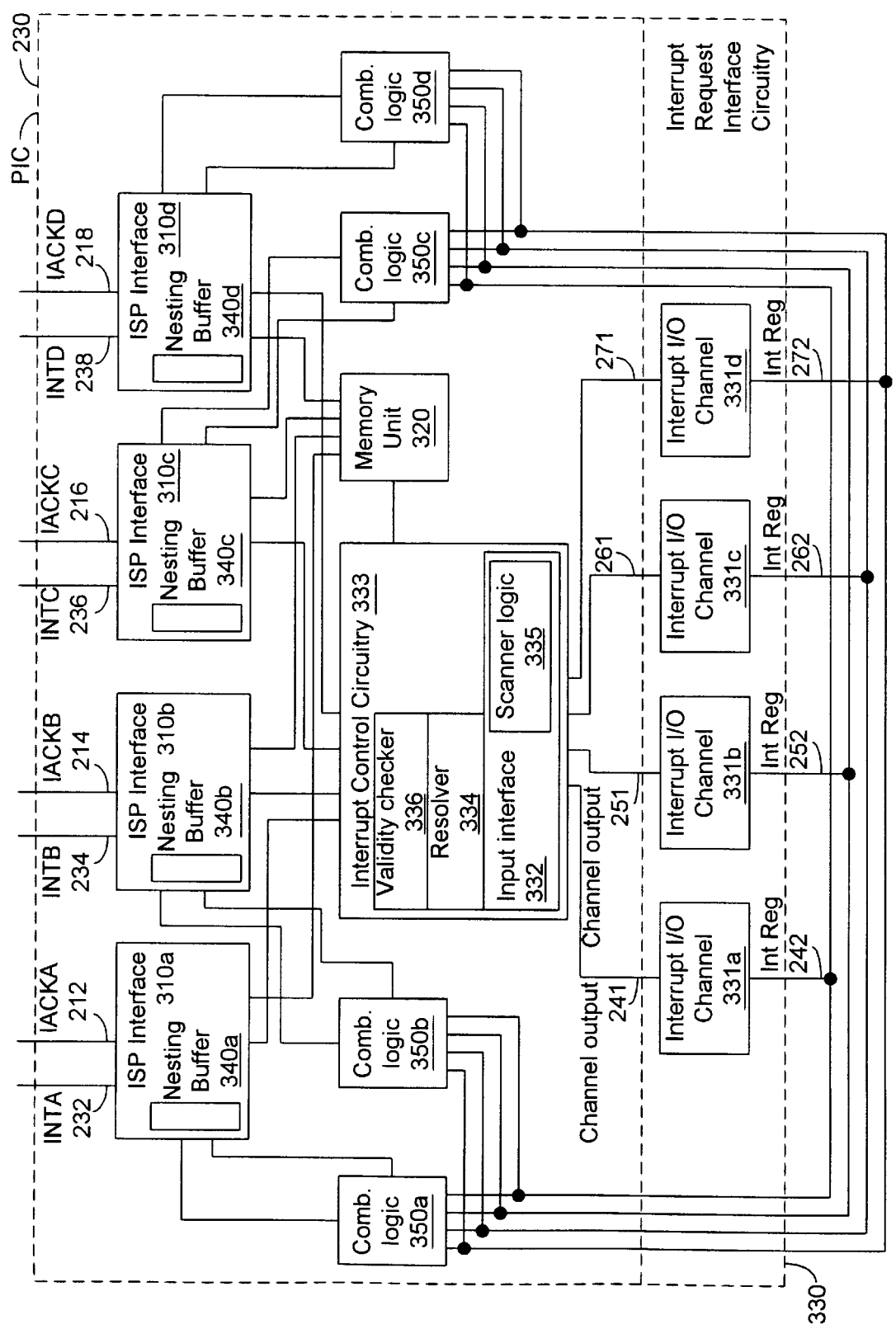
FIG. 3 is a block diagram of the programmable interrupt controller according to one embodiment of the present invention.

Referring now to FIG. 3, a block diagram is shown illustrating one embodiment of the programmable interrupt controller 230. The programmable interrupt controller 230 includes interrupt request interface circuitry 330 coupled to interrupt control circuitry 333. Interrupt request interface circuitry comprises a plurality of interrupt I/O channels 331a, 331b, 331c, and 331d corresponding to interrupt request lines 242, 252, 262, and 272. Interrupt control circuitry 333 includes an input interface 332, a resolver 334, and a validity checker 336. Central interrupt control circuit 333 is further coupled to a plurality of ISP interface channels 310a, 310b, 310c, and 310d. Each ISP interface channel 310a, 310b, 310c, 310d includes a nesting buffer 340a, 340b, 320c, and 340d, respectively, for storing interrupt requests. The interrupt request lines 242, 252, 262 and 272 are each coupled to the inputs of combinatorial logic units 350a, 350b, 350c, 350d. The outputs and control lines of combinatorial logic units 350a, 350b, 350c and 350d are, in turn, coupled to ISP interface channels 310a, 310b, 310c, and 310d, respectively. Finally, central control circuit 333 and ISP interface channels 310a, 310b, 310c, and 310d are each coupled to memory unit 320.

The interrupt request interface circuitry 330 receives the interrupt requests from the I/O devices along interrupt request lines 242, 252, 262, 272. The ISP interfaces 310a, 310b, 310c, 310d provide the ISP interrupt signals 232, 234, 236, 238, respectively, and receive the interrupt acknowledge signals 212, 214, 216, 218, respectively.

Interrupt request interface circuitry 330 comprises a plurality of interrupt I/O channels, 331a, 331b, 331c, and 331d. Each interrupt I/O channel outputs a logical high to central control circuit 333 upon a change of state (i.e., upon receipt or cancellation of an interrupt request). For example, if an edge-triggered interrupt is received on interrupt request line 242, interrupt I/O channel 331a will output a logical high along channel output line 241. Control circuit 333 will then proceed to process the interrupt request by marking the request as active (as will be discussed in more detail below) and deasserting channel output line 241. Upon reception of the next rising edge, the I/O channel will again output a logical high along channel output line 241. If a level-triggered interrupt is received on interrupt request line 242, interrupt I/O channel 331a will again cause channel output line 241 to be asserted high, causing central control circuit 333 to mark the request as active and process it. Again, the central control circuit 333 will deassert output line 241. If interrupt request line 242 goes low, indicating the deassertion of the interrupt, interrupt I/O channel 331a will again assert line channel output 241 high. Central control circuit 333 will note that the interrupt was marked as active and will read the deassertion of the interrupt, clearing the interrupt as will be discussed in more detail below. Central control circuit 333 will again deassert channel output line 241.

Input interface 332 of central control circuit 333 includes scanner logic 335 which scans each channel output 241, 251, 261, and 271 of each interrupt I/O channel 331a, 331b, 331c, and 331d. In one embodiment, scanner logic 335 comprises a state machine which polls each channel output line 241, 251, 261, 271 in round-robin fashion. When an active interrupt request is detected by the input interface 332 on one of the channel output lines 241, 251, 261, 271, the central control circuitry 333 associates a status and a priority level with the interrupt request. This information, as well as other interrupt information, is stored as a field in the programmable interrupt controller 230 for each interrupt request.

In one embodiment, memory unit 320 is a random access memory (RAM). An exemplary field is shown in FIG. 5. The information field includes a state, an interrupt vector, a priority level, a destination, a mask indication, an affinity indication, whether the interrupt is edge or level triggered, and whether the interrupt is enabled or disabled. The state may indicate if the interrupt request is active, idle, in-service, or pending. The interrupt vector indicates the location of an interrupt service routine in main memory for a CPU to execute in order to handle the situation which initiated the interrupt request. The priority level is used to decide which interrupt requests are issued to a CPU first. The destination information may be used to specify to which ISP an interrupt request should be issued. The mask indication may be used to block a particular interrupt request from issuing to an ISP. The affinity indicator may show which ISP most recently executed the interrupt and may be used in conjunction with the destination information to determine which processor should receive the interrupt.

The central interrupt control circuitry 333 accesses the information stored in the memory unit 320 by generating read cycles to the memory unit 320 and by means of a unique interrupt identification code assigned to each interrupt request. For the currently selected interrupt request, the central interrupt control circuitry 333 reads the associated information field from the memory unit 320. Based on the current state of the input (242, 252, 262, or 272) for the currently selected interrupt request and associated information read from the memory unit 320, the central interrupt control logic 333 determines the next state for the selected interrupt request. The next state is then stored in the memory unit 320. The mask, priority level, and previous state information may be used by the central interrupt control logic 333 to determine the next state for the selected interrupt request. The next state may indicate if the interrupt request is valid, idle, in-service, or pending.

The central interrupt control circuitry 333 accesses the associated information in the memory unit 320 for the current interrupt request, and resolver 334 determines, according to the destination and affinity information, to which ISP interface 310a, 310b, 310c, or 310d the interrupt is to be sent. A particular ISP may be specified, or the interrupt may be sent to an ISP based on which one serviced it most recently (and hence might still have its service routine stored in cache).

Figure 4:
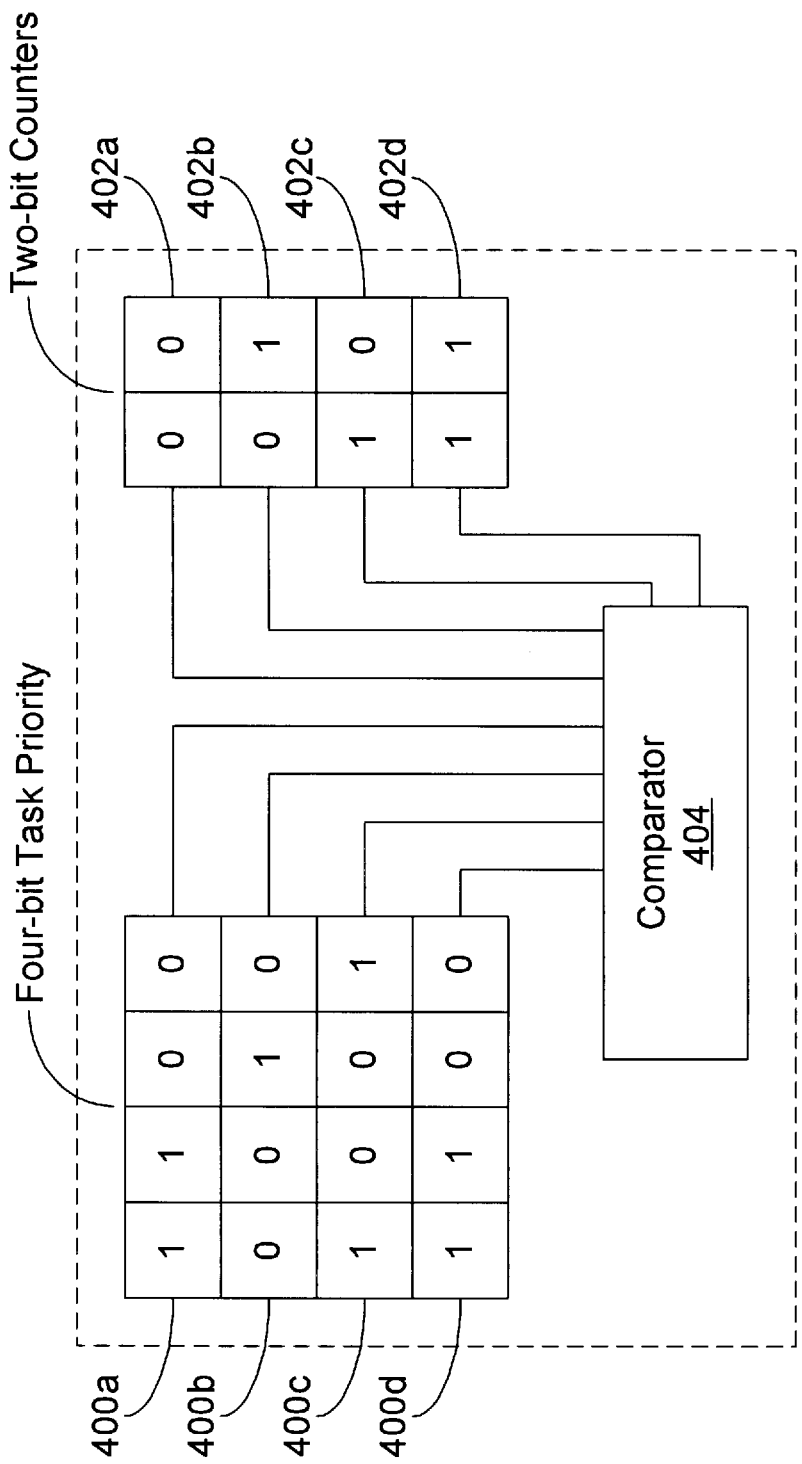
FIG. 4 illustrates a task priority resolution scheme according to one embodiment of the present invention.

In one embodiment, the interrupt is also routed to the ISP based on a task priority, indicating which ISP is executing the lowest priority task. The interrupt is routed to the ISP having the lowest task priority. For example, FIG. 4 shows a schematic representation of the task priority resolution process. In the exemplary system having four ISPs, the priority level of each device is represented by a four-bit binary number 440a, 40b, 400c, 400d, thereby allowing for sixteen task priority levels. If more than one device shares the same task priority, then the routing is made substantially randomly among the devices sharing the task priority level. This is accomplished through the use of a two-bit field 402a, 402b, 402c, 402d that is appended to the four-bit task priority number. The additional two bits function as the least significant bits in the resulting six-bit number. When the four-bit task priorities are identical, the remaining two bits are used to randomly route the interrupt. A comparator is also provided, to select the smallest six-bit number. For example, 400a and 400d show identical task priorities. Their corresponding two-bit extensions 400a, 402a are different. Accordingly, the comparator 404 will select the device corresponding to 400a and 402a.

So long as the two additional bits 402a, 402b, 402c, 402d are guaranteed to be different, the six-bit priority numbers will be different, even if the original four-bit task priority numbers 400a, 400b, 400c, 400d are the same. To ensure that a different device is selected at the next arbitration, the two-bit numbers 402a, 402b, 402c, 402d are updated after every arbitration. Accordingly, in one embodiment, the two-bit number fields are implemented as two-bit binary counters. The counters are initialized at start-up to ensure that each CPU is assigned a different two-bit number. After every arbitration, each counter is incremented synchronously and wrapped-around, if necessary. This ensures that the counters will always contain different values. It should be noted that on the two-bit number, as well as the four-bit number, may be stored in memory unit 320. Alternatively, the two- and four-bit numbers may be stored in resolver 334.

Once the interrupt has been assigned to a particular ISP, the appropriate ISP interfaces 310a, 310b, 310c, or 310d use the associated information for the current interrupt request to determine if and when to issue the interrupt request to an ISP by driving the corresponding ISP interrupt request 232, 234, 236, or 238 active. The priority level information may be used to determine when the selected interrupt request will issue to a ISP. The appropriate ISP interface 310a, 310b, 310c, or 310d may update the associated information in the memory 320 by accessing the memory unit 320 through the central interrupt control circuitry 333 in response to the appropriate interrupt acknowledge 212, 214, 216, 218 and end of interrupt being received. For example, the state information may be updated to in-service after an interrupt acknowledge is received or to idle after an end of interrupt is received.

Once the interrupt request has been routed to the appropriate ISP interface 310a, 310b, 310c, or 310d, the unique identification code for the current interrupt request is stored in an entry in the interrupt nesting buffer 340a, 340b, 340c, or 340d of the appropriate ISP interface 310a, 310b, 310c, 310d. In one embodiment, nesting buffers 340a, 340b, 340c, 310d need only store the interrupt identification according to priority. The remaining interrupt information may be referenced from memory unit 320. The nesting buffers 340a, 340b, 340c, or 340d each have a number of entries at least equal to the number of different interrupt priority levels. Each entry corresponds to a priority level. The priority level is used to determine when the interrupt request will issue. The highest priority interrupt requests held in each of the ISP interfaces 310a, 310b, 310c, 310d are issued first. Lower priority interrupt requests are held until they become the highest priority interrupt request. If a lower priority interrupt is currently being serviced, the higher priority interrupt will be given to the ISP. The former, lower priority interrupt will resume only after the higher priority interrupt has been completed. Thus, the maximum number of interrupts that may be given to a ISP at a given time is equal to the number of distinct priority levels supported by the system. Consequently, in one embodiment, the nesting buffers 340a, 340b, or 340c each have a number of entries equal to the number of different interrupt priority levels.

Determining when an interrupt request will issue based on priority is also referred to as resolving interrupt priority. The central interrupt control circuitry 333 uses the priority from the corresponding interrupt information to determine in which entry of the nesting buffer 340a, 340b, 340c, 340d the unique interrupt identification code is stored. The entry is marked as busy when a unique interrupt identification code is stored in the entry.

Each ISP interface 310a, 310b, 310c, 310d uses the unique interrupt identification code for the highest priority active entry in its respective interrupt nesting buffer 340a, 340b, 340c, 340d to access the corresponding interrupt information from the memory unit 320. In conjunction with validity checker 336, each ISP interface 310a, 310b, 310c, 310d uses the corresponding accessed information to determine if the corresponding interrupt request should be issued. For example, if the interrupt request is determined to be no longer valid, or is masked, the interrupt request may not issue to a CPU. More particularly, an ISP interface 310a, 310b, 310c, 310d may determine to void the corresponding interrupt request if the accessed information indicates that the corresponding interrupt request has become invalid while its unique interrupt identification code was pending in a nesting buffer 340a, 340b, 340c, 340d waiting to become highest priority. This period of waiting is referred to as interrupt latency. This latency may be relatively large, especially for low priority interrupt requests. The validity checker 320 monitors the validity of the interrupt requests stored within the ISP interfaces 310a, 310b, 310c, and 310d. If an interrupt request becomes invalid before it issues, the validity checker 320 indicates an invalid state for the interrupt request to the appropriate ISP interface 310a, 310b, 310c, and 310d to the central interrupt control circuitry 333. Thus, the invalid interrupt request is cleared (canceled) before it needlessly issues. In that case, the interrupt status in memory unit 320 is updated to idle. In one embodiment, the validity checker 336 monitors the condition of each input 241, 251, 261, and 271 to the scanner 335. If one of the interrupt request signals 242, 252, 262, 272 changes from active to inactive before the corresponding interrupt request issues to the ISP, then the validity checker 336 determines the interrupt request to be invalid. It is noted that in other embodiments, different methods and criteria may be used to determine the validity of an interrupt request.

When an interrupt request becomes the highest priority interrupt request in one of the ISP interfaces 310a, 310b, 310c, 310d, the appropriate ISP interface 310a, 310b, 310c, 310d issues the interrupt request to the corresponding ISP by driving active the appropriate ISP interrupt signal 232, 234, 236, 238. The validity checker 336 continues to monitor the validity of the interrupt request as described above. If the validity checker 336 determines that the interrupt request has become invalid before the ISP responds (i.e., by returning the interrupt acknowledge signal), then the interrupt request is cleared as described above and the appropriate ISP interface 310a, 310b, 310c, 310d drives inactive the corresponding ISP interrupt signal 232, 234, 236, or 238. Thus, the ISP may be prevented from needlessly responding to an invalid interrupt request.

If the interrupt request stays valid and an ISP responds by driving one of the interrupt acknowledge signals 212, 214, 216, 218 active, the corresponding ISP interface 310a, 310b, 310c, 310d receives the active interrupt acknowledge signal 212, 214, 216, 218 from the corresponding ISP. Also, the corresponding status entry is marked as in-service. The validity checker continues to monitor the validity of the corresponding interrupt request. If the request is valid at this point, the appropriate ISP interface 310a, 310b, 310c, 310d sends the corresponding interrupt vector over the host bus 280 to the ISP. The ISP executes the interrupt routine indicated by the interrupt vector and returns an end of interrupt (EOI) command to the programmable interrupt controller 230 over the host bus 280. When the appropriate ISP interface 310a, 310b, 310c, 310d receives the EOI command, the interrupt request is cleared. The status for the corresponding interrupt request is then changed to idle to indicate that the corresponding interrupt request signal 242, 252, 262, 272 input is available for a new interrupt request. Finally, the next highest priority interrupt request is processed as described above, the appropriate ISP interface 310a, 310b, 310c, 310d accessing the interrupt information referenced by the unique interrupt identification code from the corresponding entry of the appropriate interrupt nesting buffer 340a, 340b, 340c, 340d.

Because of the interrupt latency problem, it is possible for the interrupt request to become invalid before the appropriate ISP interface 310a, 310b, 310c, 310d is ready to send the corresponding interrupt vector, but after the acknowledge interrupt has been received. More particularly, as discussed above, the validity checker circuit monitors the interrupt lines 241, 251, 261, 271, which are polled by scanner 332 on a round-robin basis. Thus, it is possible for a particular interrupt to become invalid between a first time it has been polled and the next. Consequently, there is provided combinatorial logic unit 350a, 350b, 350c, 350d coupled between the interrupt request lines 242, 252, 262, 272 and the ISP interfaces 310a, 310b, 310c, 310d with a control line activated by the particular interrupt then being serviced. In one embodiment, combinatorial logic units 350a, 350b, 350c, and 350d comprise multiplexers, but it is to be understood that other types of combinatorial logic circuits may be used. Each combinatorial logic unit 350a, 350b, 350c, 350d returns a signal to its corresponding interface channel when the particular interrupt that is being serviced becomes invalid prior to the ISP interface channel returning the interrupt vector to the ISP.

Upon reception of the combinatorial logic unit's signal indicating deassertion of the interrupt, the appropriate ISP interface 310a, 310b, 310c, 310d sends a spurious interrupt vector to its associated ISP instead of the interrupt vector. The spurious interrupt vector points to a much shorter routine than a regular interrupt vector. For example, a typical interrupt service routine may include ISP instruction to save register state information, read information from a device which initiated the interrupt request, and then determine how to respond to the interrupt request. In contrast, a typical spurious interrupt routine may instruct the ISP to immediately return to the ISP's previous operations. Thus the ISP does not needlessly waste time executing an interrupt routine for an invalid interrupt request. The interrupt request is then cleared and the appropriate ISP interface 310a, 310b, 310c, 310d goes on to the next highest priority interrupt request.

The source of the interrupt request signals 242, 252, 262, 272 are indicated in FIG. 2 to be I/O devices 250, 260, 270, 280 or bus bridge 240. However, it is noted that in other embodiments, different interrupt request sources may exist. Some of these other sources may be part of the same integrated circuit device in which the programmable interrupt controller 230 is implemented. These sources located within the same integrated circuit are referred to as internal interrupt request sources. One example of such a source is a timer which generates one or more internal interrupt requests according to programmable time out conditions. Also, interrupt requests may come from the ISP interfaces 310a, 310b, 310c, 310d in response to interrupt requests by the corresponding ISP.

Different types of interrupt requests such as those described above may require different handling in the programmable interrupt controller 230. A portion of the unique interrupt identification code may be used to distinguish between different types of interrupt requests for this purpose. For example, in one embodiment, one portion of the unique interrupt identification code may be used to distinguish between interrupt requests from internal and external sources. Another portion may be used to distinguish between interrupts from a timer or from an ISP.

More particularly, the information field stored in memory unit 320 for timer and inter-processor interrupts may differ from the information field for external interrupts. The interrupt information field for such interrupts will include status information for the individual ISPs. For example, the field will indicate whether the interrupt for each receiving ISP is active, dispatched, or acknowledged, as well as the destination, priority, and vector for each interrupt.

The invention described in the above detailed description is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. An interrupt controller for use in a computer system including at least one processor and at least one interrupt source, wherein the interrupt controller comprises:
   a plurality of interrupt input lines;
   a control circuit configured to sequentially monitor each of the plurality of interrupt input lines one at a time to thereby detect active interrupt input signals;
   a processor interface unit for providing a processor interrupt signal to a designated processor in response to the control circuit detecting an active interrupt signal at one of the plurality of interrupt input lines; and
   a bypass circuit coupled to the processor interface and configured to indicate a de-assertion of the active interrupt signal at said one of the plurality of interrupt input lines,
      wherein the processor interface is configured to provide a spurious interrupt vector to the processor in response to the bypass circuit indicating said de-assertion even if the control circuit has not yet detected said de-assertion.

2. The interrupt controller of claim 1, wherein the control circuit is further configured to update an interrupt status location of a storage unit in response to the detection of an active interrupt.

3. The interrupt controller of claim 2, wherein the bypass unit is coupled to the control circuit to provide an interrupt-invalidated signal when said de-assertion of the active interrupt signal is indicated.

4. The interrupt controller of claim 3, wherein said control unit updates said interrupt status location of said storage unit to indicate an idle status in response to said interrupt invalidated signal.

5. The interrupt controller of claim 1, wherein the bypass circuit comprises a multiplexer coupled to the interrupt input lines, and wherein the processor interface unit is configured to set the multiplexer to monitor said one of the plurality of interrupt input lines.

6. The interrupt controller of claim 5, wherein the processor interface unit sets the multiplexer based on the active interrupt signal detected by the control circuit.

7. The interrupt controller of claim 1, wherein said spurious vector is provided to the processor in lieu of another vector associated with the active interrupt signal if said bypass circuit indicates said de-assertion.

8. A computer system comprising:
   a peripheral device configured to assert an interrupt request signal;
   a processor configured to receive a processor interrupt signal and to responsively execute an interrupt service routine;
   an interrupt controller which includes:
      a plurality of interrupt input lines including a particular interrupt input line coupled to receive said interrupt request signal from said peripheral device;
      a control circuit configured to sequentially monitor each of the plurality of interrupt input lines one at a time to thereby detect an active interrupt request signal at any of said plurality of interrupt input lines;
      a processor interface unit for asserting said processor interrupt signal to said processor in response to the control circuit detecting an active interrupt signal at one of the plurality of interrupt input lines; and
      a bypass circuit coupled to the processor interface and configured to indicate a de-assertion of the active interrupt signal at said one of the plurality of interrupt input lines,
         wherein the processor interface is configured to provide a spurious interrupt vector to the processor in response to the bypass circuit indicating said de-assertion even if the control circuit has not yet detected said de-assertion.

9. The computer system of claim 8, wherein the control circuit is further configured to update an interrupt status location of a storage unit in response to the detection of an active interrupt request signal.

10. The computer system of claim 9, wherein the bypass unit is coupled to the control circuit to provide an interrupt-invalidated signal when said de-assertion of the active interrupt signal is indicated.

11. The computer system of claim 10, wherein said control unit updates said interrupt status location of said storage unit to indicate an idle status in response to said interrupt invalidated signal.

12. The computer system of claim 8, wherein the bypass circuit comprises a multiplexer coupled to the interrupt input lines, and wherein the processor interface unit is configured to set the multiplexer to monitor said one of the plurality of interrupt input lines.

13. The computer system of claim 8, wherein said spurious vector is provided to the processor in lieu of another vector associated with said active interrupt signal if said bypass circuit indicates said de-assertion.

14. A multiprocessing system comprising:
   a plurality of processing units;
   a plurality of peripheral devices, wherein each of said peripheral devices is configured to generate a respective interrupt signal; and
   a central interrupt control unit coupled to said plurality of processing units and to said plurality of peripheral devices, wherein said central interrupt control unit is configured to receive said respective interrupt signals from said plurality of peripheral devices and is configured to provide corresponding processor interrupt signals to designated processing units, wherein said central interrupt control unit includes:
      a plurality of interrupt channels coupled to said plurality of peripheral devices via a plurality of interrupt input lines, wherein each interrupt channel is configured to detect an assertion of an interrupt of a corresponding peripheral device, and wherein each interrupt channel is associated with a programmable storage unit for storing a vector and a priority value associated with said interrupt of said corresponding peripheral device;
      a plurality of CPU channels coupled to said plurality of processing units, wherein each CPU channel is configured to receive interrupt information to control assertions of a corresponding processor interrupt, wherein said interrupt information includes said vector and priority value corresponding to each of several selected interrupts of said peripheral devices that have been asserted; and
      a central controller coupled to said plurality of interrupt channels and to said plurality of CPU channels, wherein said central controller is configured to sequentially monitor each of the plurality of interrupt channels one at a time to thereby detect asserted interrupts, wherein said central controller is configured to route said interrupt information corresponding to said each of several interrupts that have been asserted from any of said plurality of interrupt channels to a designated CPU channel; and a plurality of bypass circuits coupled to the plurality of CPU channels, wherein each bypass circuit is configured to indicate a de-assertion of an asserted interrupt being processed by a corresponding CPU channel, wherein the corresponding CPU channel is configured to provide a spurious interrupt vector to the corresponding processor in response to the bypass circuit indicating said de-assertion even if the central controller has not yet detected said de-assertion.

15. The multiprocessing system as recited in claim 14 wherein said central interrupt control unit is fabricated on a single integrated circuit die.

16. The multiprocessing system as recited in claim 14 wherein said vector corresponding with said interrupt of said corresponding peripheral device points to a starting address of an interrupt service routine.

17. The multiprocessing system as recited in claim 14, wherein said spurious vector is provided to the corresponding processor in lieu of said vector associated with said interrupt if said bypass circuit detects said de-assertion.

* * * * *